(12) United States Patent
Shinde

(10) Patent No.: US 12,131,282 B1
(45) Date of Patent: Oct. 29, 2024

(54) SYSTEMS AND METHODS FOR SOLVING MULTI-OBJECTIVE HIERARCHICAL LINEAR PROGRAMMING PROBLEMS USING PREVIOUSLY-SOLVED SOLUTION INFORMATION

(71) Applicant: Blue Yonder Group, Inc., Scottsdale, AZ (US)

(72) Inventor: Vishal Shinde, Bangaluru (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 171 days.

(21) Appl. No.: 17/679,871

(22) Filed: Feb. 24, 2022

Related U.S. Application Data

(60) Provisional application No. 63/155,936, filed on Mar. 3, 2021.

(51) Int. Cl.
| | | |
|---|---|---|
| G06Q 10/00 | (2023.01) | |
| G06Q 10/04 | (2023.01) | |
| G06Q 10/083 | (2023.01) | |

(52) U.S. Cl.
CPC ........... *G06Q 10/083* (2013.01); *G06Q 10/04* (2013.01)

(58) Field of Classification Search
None
See application file for complete search history.

(56) References Cited

U.S. PATENT DOCUMENTS

| | | | | |
|---|---|---|---|---|
| 6,044,361 | A * | 3/2000 | Kalagnanam | G06Q 10/04 705/28 |
| 8,965,548 | B1 * | 2/2015 | Kamath | G06Q 10/06315 700/100 |
| 2003/0167265 | A1 * | 9/2003 | Corynen | G06Q 10/04 |
| 2007/0055585 | A1 * | 3/2007 | Agrawal | G06Q 30/0601 705/28 |
| 2008/0243907 | A1 * | 10/2008 | Stergiou | G06F 16/31 707/999.102 |
| 2009/0271236 | A1 * | 10/2009 | Ye | G06Q 10/083 705/330 |

(Continued)

OTHER PUBLICATIONS

D Kim et al. (Development of a statistical matching method with categorical data), master thesis, Dec. 12, 2018—Universiteit Leiden. (Year: 2018).*

(Continued)

*Primary Examiner* — Hafiz A Kassim
(74) *Attorney, Agent, or Firm* — Spencer Fane LLP; Steven J. Laureanti

(57) ABSTRACT

A system and method of solving supply chain planning problems modeled as multi-objective hierarchical linear programming problems receive supply chain input data for a supply chain planning problem, solve a first multi-objective hierarchical linear programming problem, store a cumulative list of bound changes, receive changes to the supply chain input data, model a second supply chain planning problem as a second multi-objective hierarchal linear programming problem based, at least in part, on the one or more changes to the supply chain input data, derive an intermediate objective based, at least in part, on the cumulative list of bound change, and solve the second multi-objective hierarchical linear programming problem, using the basis of the solved intermediate objective.

14 Claims, 5 Drawing Sheets

(56) References Cited

U.S. PATENT DOCUMENTS

| | | | | |
|---|---|---|---|---|
| 2013/0117162 A1* | 5/2013 | Feng | ............... | G06Q 10/04 |
| | | | | 705/28 |
| 2017/0109631 A1* | 4/2017 | Cheng | ............... | G06Q 10/047 |
| 2017/0364847 A1* | 12/2017 | Kamath | ............... | G06Q 10/0633 |
| 2019/0378066 A1* | 12/2019 | Zhu | ............... | G06Q 10/0633 |

OTHER PUBLICATIONS

T Achterberg et al. (Constraint integer programming), 2007—depositonce.tu-berlin.de. (Year: 2007).*

Karásek, Jan (High-Level Object Oriented Genetic Programming in Logistic Warehouse Optimization: doctoral thesis. Brno: Brno University of Technology, Faculty of Electrical Engineering and Communication, Department of Telecommunications, 2014. (Year: 2014).*

S Abosuliman (A system dynamics & emergency logistics model for post-disaster relief operations)—2014—researchrepository.rmit.edu.au). (Year: 2014).*

* cited by examiner

SYSTEMS AND METHODS FOR SOLVING MULTI-OBJECTIVE HIERARCHICAL LINEAR PROGRAMMING PROBLEMS USING PREVIOUSLY-SOLVED SOLUTION INFORMATION

CROSS REFERENCE TO RELATED APPLICATIONS

The present disclosure is related to that disclosed in the U.S. Provisional Application No. 63/155,936, filed Mar. 3, 2021, entitled "Systems and Methods for Solving Multi-Objective Hierarchical Linear Programming Problems Using Previously-Solved Solution Information." U.S. Provisional Application No. 63/155,936 is assigned to the assignee of the present application. The subject matter disclosed in U.S. Provisional Application No. 63/155,936 is hereby incorporated by reference into the present disclosure as if fully set forth herein. The present invention hereby claims priority under 35 U.S.C. § 119 (e) to U.S. Provisional Application No. 63/155,936.

TECHNICAL FIELD

The present disclosure relates generally to supply chain planning and specifically to systems and methods of solving supply chain planning problems modeled as multi-objective hierarchical linear programming problems.

BACKGROUND

During supply chain planning, a supply chain plan may be generated by solving a supply chain planning problem modeled as a single- or multi-objective linear programming problem (LPP). For example, a supply chain planner may model a master production problem as a multi-objective hierarchical LPP. The supply chain planner may update and re-solve the supply chain planning problem from time-to-time when changes occur in the supply chain. However, even when there are few changes to the supply chain and these changes are known, re-solving the supply chain planning problem may take as much time to solve as the previous supply chain planning problem. This inefficiency in re-solving a previously-solved supply chain problem when there are only a few known changes to a supply chain is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
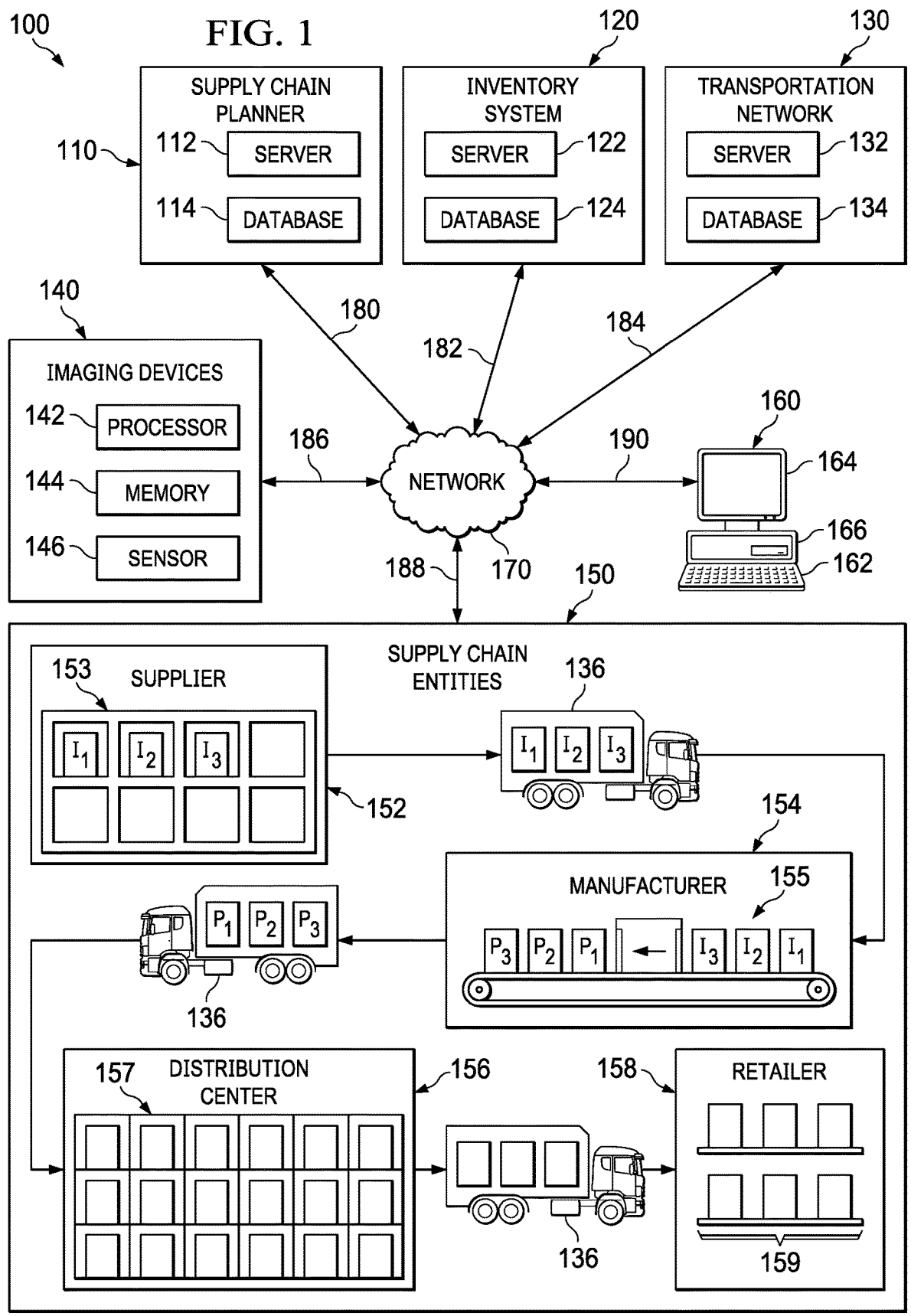
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Embodiments of the following disclosure provide a system and method to solve a supply chain planning problem modeled as a single- or multi-objective linear programming problem (LPP) with reduced computational requirements and increased speed without impairing the quality of the calculated plan result and significantly reduce the runtime required to re-solve the supply chain planning problem after changes in the supply chain occur by using the solution information of a previous or earlier solve of the supply chain planning problem. Embodiments efficiently solve subsequent LPPs without reducing the quality of the final plan based, at least in part on, using a starting solution of the subsequent LPP that is a feasible starting solution from the previous LPP.

FIG. 1 illustrates supply chain network 100, in accordance with a first embodiment. Supply chain network 100 comprises supply chain planner 110, inventory system 120, transportation network 130, one or more imaging devices 140, one or more supply chain entities 150, one or more computers 160, network 170, and one or more communication links 180-190. Although a single supply chain planner 110, a single inventory system 120, a single transportation network 130, one or more imaging devices 140, one or more supply chain entities 150, one or more computers 160, a single network 170, and one or more communication links 180-190 are shown and described, embodiments contemplate any number of supply chain planners 110, inventory systems 120, transportation networks 130, imaging devices 140, supply chain entities 150, computers 160, networks 170, and communication links 180-190, according to particular needs.

In one embodiment, supply chain planner 110 comprises server 112 and database 114. Server 112 comprises one or more modules that model, generate, and solve a supply chain planning problem to produce a supply chain plan as a solution to a multi-objective hierarchical LPP. According to embodiments, solver 212 (FIG. 2) of supply chain planner 110 may use solution information from a previous solving run of a multi-objective hierarchical LPP, including but not limited to one or more intermediate objectives (Obj0) from a previous run, to increase the efficiency of a subsequent solving run of the multi-objective hierarchical LPP. As described in more detail herein, solver 212 may solve one or more lower-priority objectives using a list of variables to be fixed at their upper and lower bounds, generated during the solve of a higher-priority objective.

In addition, solver 212 may use a list of variables generated from an earlier solving run of the multi-objective hierarchical LPP, and/or a cumulative list of variable bound changes, during a later solving run of the same multi-objective hierarchical LPP comprising some changes to supply chain input data 220. After solving for each of the multiple objectives (representing one or more business objectives), the final mathematical solution of the multi-objective hierarchical LPP, when converted to a supply chain, may represent an optimized supply chain plan. Initially, a supply chain planning problem may be converted into a multi-objective LPP wherein the mathematical constraints, objectives, and bounds on variables of the supply chain planning problem is mapped to mathematical expressions in the multi-objective LPP. After solving, the mapping of this conversion may be used to translate the solution of the multi-objective LPP to a supply chain plan.

Inventory system 120 comprises server 122 and database 124. Server 122 of inventory system 120 is configured to receive and transmit item data, including item identifiers, pricing data, attribute data, inventory levels, and other like data about one or more items at one or more locations in supply chain network 100. Server 122 stores item data at, and retrieves item data from, database 124 or one or more locations in supply chain network 100.

Transportation network 130 comprises server 132 and database 134. According to embodiments, transportation network 130 directs one or more transportation vehicles 136 to ship one or more items from one or more stocking locations of one or more supply chain entities 150 based, at least in part, on a supply chain plan or a re-allocation of materials or capacity determined by supply chain planner 110. In addition, the number of items shipped by one or more transportation vehicles 136 in transportation network 130 may also be based, at least in part, on the number of items currently in stock at one or more stocking locations of one or more supply chain entities 150, the number of items currently in transit, a forecasted demand, a supply chain disruption, and the like. One or more transportation vehicles 136 comprise, for example, any number of trucks, cars, vans, boats, airplanes, unmanned aerial vehicles (UAVs), cranes, robotic machinery, or the like. According to embodiments, one or more transportation vehicles 136 may be associated with one or more supply chain entities 150 and may be directed by automated navigation including, for example, GPS guidance, according to particular needs.

One or more imaging devices 140 comprise one or more processors 142, memory 144, one or more sensors 146, and may include any suitable input device, output device, fixed or removable computer-readable storage media, or the like. According to one embodiment, one or more imaging devices 140 comprise one or more electronic devices that may receive imaging information from one or more sensors 146 or from one or more databases in supply chain network 100. One or more imaging devices 140 may identify one or more items near one or more sensors 146 and generate a mapping of the identified one or more items in supply chain network 100. As explained in more detail below, transportation network 130 and/or one or more supply chain entities 150 use the mapping of an item to locate the item in supply chain network 100. The location of the item is then used to coordinate the storage and transportation of items in supply chain network 100 according to one or more plans generated by supply chain planner 110 and/or a reallocation of materials or capacity determined by solver 212. Plans may comprise one or more of a master supply chain plan, production plan, allocation plan, campaign plan, distribution plan, and the like.

One or more imaging devices 140 may comprise a mobile handheld device such as, for example, a smartphone, a tablet computer, a wireless device, or the like. In addition, or as an alternative, one or more imaging devices 140 comprise one or more networked electronic devices configured to transmit item identity information to one or more databases as an item passes by or is scanned by one or more sensors 146. This may include, for example, a stationary scanner located at transportation network 130 or one or more supply chain entities 150 and which identifies items as the items pass near the scanner, including, for example, in one or more transportation vehicles. One or more sensors 146 of one or more imaging devices 140 may comprise an imaging sensor, such as, for example, a camera, scanner, electronic eye, photodiode, charged coupled device (CCD), barcode scanner, or any other device that detects visual information (such as, for example, color, shape, size, fill level, or the like). One or more imaging devices 140 may comprise, for example, a mobile handheld electronic device such as, for example, a smartphone, a tablet computer, a wireless communication device, and/or one or more networked electronic devices configured to image items using one or more sensors 146 and transmit product images to one or more databases local to, or remote from, supply chain network 100.

In addition, or as an alternative, one or more sensors 146 may comprise a receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or other like encodings of identifying information. One or more imaging devices 140 may generate a mapping of one or more items in supply chain network 100 by scanning an identifier or object associated with an item and identifying the item based, at least in part, on the scan.

Additionally, one or more sensors 146 of one or more imaging devices 140 may be located at one or more locations local to, or remote from, one or more imaging devices 140, including, for example, one or more sensors 146 integrated into one or more imaging devices 140 or one or more sensors 146 remotely located from, but communicatively coupled with, one or more imaging devices 140. According to some embodiments, one or more sensors 146 may be configured to communicate directly or indirectly with supply chain planner 110, inventory system 120, transportation network 130, one or more imaging devices 140, one or more supply chain entities 150, one or more computers 160, and/or network 170 using one or more communication links 180-190.

As illustrated in FIG. 1, supply chain network 100 comprising supply chain planner 110, inventory system 120, transportation network 130, one or more imaging devices 140, and one or more supply chain entities 150 may operate on one or more computers 160 that are integral to or separate from the hardware and/or software that support supply chain planner 110, inventory system 120, transportation network 130, one or more imaging devices 140, and one or more supply chain entities 150. One or more computers 160 may include any suitable input device 162, such as a keypad, mouse, touch screen, microphone, or other device to input information. Output device 164 may convey information associated with the operation of supply chain network 100, including digital or analog data, visual information, or audio information.

One or more computers 160 may include fixed or removable computer-readable storage media 166, such as, for example, a non-transitory computer-readable medium, magnetic computer disk, flash drive, CD-ROM, in-memory device or other suitable medium to receive output from, and provide input to, supply chain network 100. One or more computers 160 may include one or more processors and associated memory to execute instructions and manipulate information according to the operation of supply chain network 100 and any of the methods described herein. In addition, or as an alternative, embodiments contemplate executing the instructions on one or more computers 160 that cause one or more computers 160 to perform functions of the method. An apparatus implementing special purpose logic circuitry, for example, one or more field programmable gate arrays (FPGA) or application-specific integrated circuits (ASIC), may perform functions of the methods described herein. Further examples may comprise articles of manufacture such as, for example, tangible computer-readable media that have computer-readable instructions encoded thereon, and the instructions may comprise instructions to perform functions of the methods described herein.

Supply chain planner 110, inventory system 120, transportation network 130, one or more imaging devices 140, and one or more supply chain entities 150 may each operate on one or more separate computers, a network of one or more separate or collective computers, or may operate on one or more shared computers. In addition, supply chain network 100 may comprise a cloud-based computing system having processing and storage devices at one or more locations, local to, or remote from supply chain planner 110, inventory system 120, transportation network 130, one or more imaging devices 140, and one or more supply chain entities 150. In addition, each of one or more computers 160 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with supply chain planner 110, inventory system 120, transportation network 130, one or more imaging devices 140, and one or more supply chain entities 150. These one or more users may include, for example, a "manager" or a "planner" handling supply chain planning and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, supply chain master planning, plan adjustment after supply chain disruptions, order placement, automated warehouse operations (including removing items from and placing items in inventory), robotic production machinery (including production of items), and/or one or more related tasks within supply chain network 100.

One or more supply chain entities 150 may represent one or more suppliers 152, manufacturers 154, distribution centers 156, and retailers 158 in one or more supply chain networks, including one or more enterprises. One or more suppliers 152 may be any suitable entity that offers to sell or otherwise provides one or more items or components to one or more manufacturers. One or more suppliers 152 may, for example, receive an item from a first supply chain entity 150 in supply chain network 100 and provide the item to another supply chain entity 150. Items may comprise, for example, components, materials, products, parts, supplies, or other items, that may be used to produce products. In addition, or as an alternative, an item may comprise a supply or resource that is used to manufacture the item but does not become a part of the item. One or more suppliers 152 may comprise automated distribution systems 153 that automatically transport items to one or more manufacturers 154 based, at least in part, on a supply chain plan, a material or capacity reallocation, current and projected inventory levels, and/or one or more additional factors described herein.

One or more manufacturers 154 may be any suitable entity that manufactures at least one item. One or more manufacturers 154 may use one or more items during the manufacturing process to produce any manufactured, fabricated, assembled, or otherwise processed item, material, component, good, or product. In one embodiment, a product represents an item ready to be supplied to, for example, another one or more supply chain entities 150, such as one or more suppliers 152, an item that needs further processing, or any other item. One or more manufacturers 154 may, for example, produce and sell a product to one or more suppliers 152, another one or more manufacturers 154, distribution centers 156, retailers 158, a customer, or any other suitable entity. One or more manufacturers 154 may comprise automated robotic production machinery 155 that produce products based, at least in part, on a supply chain plan, a material or capacity reallocation, current and projected inventory levels, and/or one or more additional factors described herein.

One or more distribution centers 156 may be any suitable entity that offers to sell or otherwise distributes at least one product to one or more retailers 158 and/or customers. One or more distribution centers 156 may, for example, receive a product from a first supply chain entity 150 in supply chain network 100 and store and transport the product for a second supply chain entity 150. One or more distribution centers 156 may comprise automated warehousing systems 157 that automatically transport products to one or more retailers 158 or customers and/or automatically remove an item from, or place an item into, inventory based, at least in part, on a supply chain plan, a material or capacity reallocation, current and projected inventory levels, and/or one or more additional factors described herein.

One or more retailers 158 may be any suitable entity that obtains one or more products to sell to one or more customers. In addition, one or more retailers may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location.

Although one or more suppliers 152, manufacturers 154, distribution centers 156, and retailers 158 are shown and described as separate and distinct entities, the same entity 150 may simultaneously act as any other one or more suppliers 152, manufacturers 154, distribution centers 156, and retailers 158. For example, one or more manufacturers 154 acting as a manufacturer could produce a product, and the same entity could act as one or more suppliers 152 to supply a product to another one or more supply chain entities 150. Although one example of supply chain network 100 is shown and described, embodiments contemplate any configuration of supply chain network 100, without departing from the scope of the present disclosure.

In one embodiment, supply chain planner 110 may be coupled with network 170 using communication link 180, which may be any wireline, wireless, or other link suitable to support data communications between supply chain planner 110 and network 170 during operation of supply chain network 100. Inventory system 120 may be coupled with network 170 using communication link 182, which may be any wireline, wireless, or other link suitable to support data communications between inventory system 120 and network 170 during operation of supply chain network 100. Transportation network 130 may be coupled with network 170 using communication link 184, which may be any wireline, wireless, or other link suitable to support data communications between transportation network 130 and network 170 during operation of supply chain network 100. One or more imaging devices 140 are coupled with network 170 using communication link 186, which may be any wireline, wireless, or other link suitable to support data communications between one or more imaging devices 140 and network 170 during operation of distributed supply chain network 100. One or more supply chain entities 150 may be coupled with network 170 using communication link 188, which may be any wireline, wireless, or other link suitable to support data communications between one or more supply chain entities 150 and network 170 during operation of supply chain network 100. One or more computers 160 may be coupled with network 170 using communication link 190, which may be any wireline, wireless, or other link suitable to support data communications between one or more computers 160 and network 170 during operation of supply chain network 100.

Although communication links 180-190 are shown as generally coupling supply chain planner 110, inventory system 120, transportation network 130, one or more imaging devices 140, one or more supply chain entities 150, and one or more computers 160 to network 170, each of supply chain planner 110, inventory system 120, transportation network 130, one or more imaging devices 140, one or more supply chain entities 150, and one or more computers 160 may communicate directly with each other, according to particular needs.

In another embodiment, network 170 includes the Internet and any appropriate local area networks (LANs), metropolitan area networks (MANs), or wide area networks (WANs) coupling supply chain planner 110, inventory system 120, transportation network 130, one or more imaging devices 140, one or more supply chain entities 150, and one or more computers 160. For example, data may be maintained locally or externally of supply chain planner 110, inventory system 120, transportation network 130, one or more imaging devices 140, one or more supply chain entities 150, and one or more computers 160 and made available to one or more associated users of supply chain planner 110, inventory system 120, transportation network 130, one or more imaging devices 140, one or more supply chain entities 150, and one or more computers 160 using network 170 or in any other appropriate manner. For example, data may be maintained in a cloud database at one or more locations external to supply chain planner 110, inventory system 120, transportation network 130, one or more imaging devices 140, one or more supply chain entities 150, and one or more computers 160 and made available to one or more associated users of supply chain planner 110, inventory system 120, transportation network 130, one or more imaging devices 140, one or more supply chain entities 150, and one or more computers 160 using network 170, the cloud, or in any other appropriate matter. Those skilled in the art will recognize that the complete structure and operation of network 170 and other components within supply chain network 100 are not depicted or described. Embodiments may be employed in conjunction with known communications networks and other components.

In accordance with the principles of embodiments described herein, supply chain planner 110 may reallocate inventory of one or more items among demands or orders of one or more supply chain entities 150. In addition, one or more computers 160 associated with supply chain network 100 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on current inventory, production levels, and/or one or more other factors described herein. For example, the methods described herein may include one or more computers 160 receiving product data from automated machinery having at least one sensor and product data 224 corresponding to an item detected by the automated machinery. Received product data may include an image of the item, an identifier, as described above, and/or other data associated with the item, including, for example, dimensions, texture, estimated weight, and the like.

According to embodiments, the methods may further include one or more computers 160 looking up received product data 224 in a database system associated with supply chain planner 110 to identify the item corresponding to product data 224 received from automated machinery. Based on the identification of the item, one or more computers 160 may also identify (or alternatively generate) a first mapping in the database system, where the first mapping is associated with the current location of the identified item. One or more computers 160 may also identify a second mapping in the database system, where the second mapping is associated with a past location of the identified item. One or more computers 160 may also compare the first mapping and the second mapping to determine if the current location of the identified item in the first mapping is different than the past location of the identified item in the second mapping. One or more computers 160 may then send instructions to the automated machinery based, as least in part, on one or more differences between the first mapping and the second mapping such as, for example, to locate items to add to or remove from an inventory of or shipment for one or more supply chain entities 150. In addition, or as an alternative, supply chain planner 110 monitors one or more supply chain constraints of one or more items at one or more supply chain entities 150 and adjusts the orders and/or inventory of one or more supply chain entities 150 at least partially based on one or more supply chain constraints.

Figure 2:
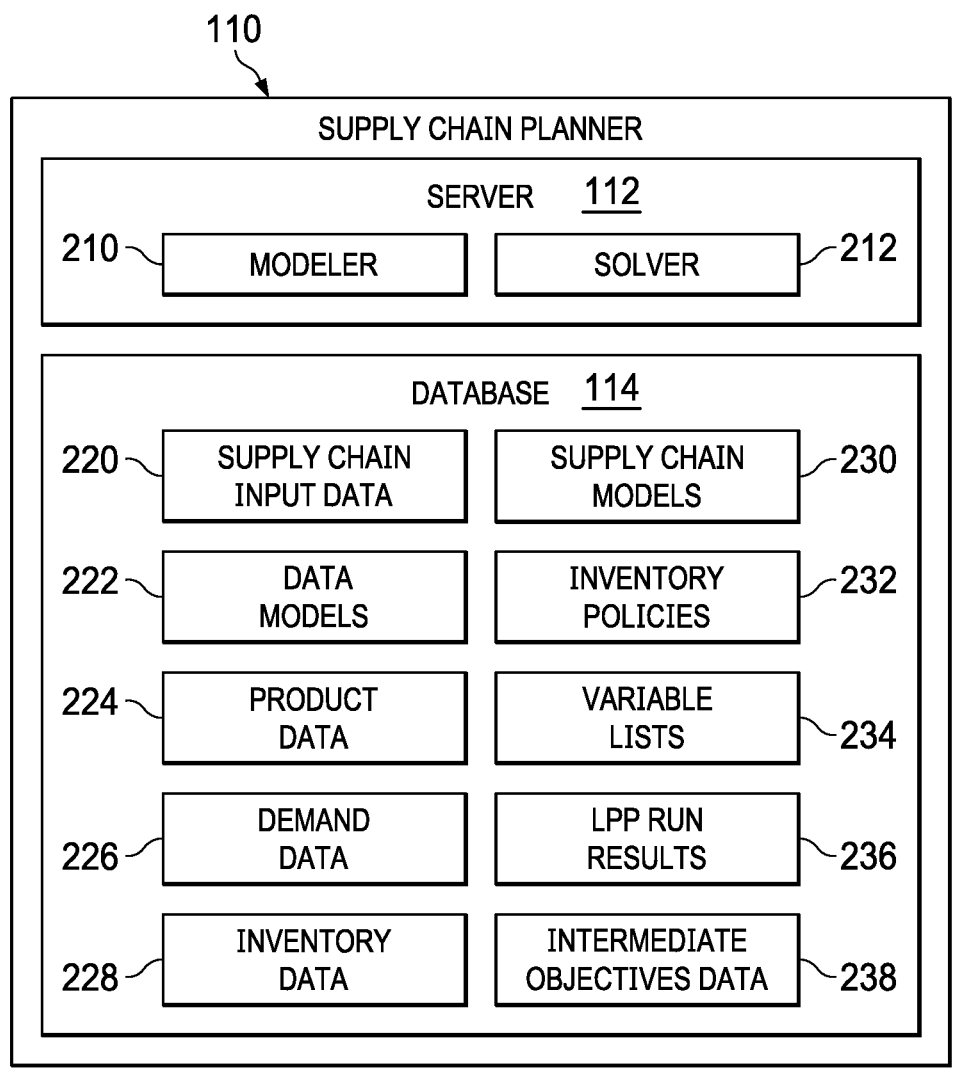
FIG. 2 illustrates the supply chain planner of FIG. 1 in greater detail, in accordance with an embodiment.

FIG. 2 illustrates supply chain planner 110 of FIG. 1 in greater detail, in accordance with an embodiment. As described above, supply chain planner 110 comprises server 112 and database 114. Although supply chain planner 110 is shown as comprising a single server 112 and a single database 114, embodiments contemplate any suitable number of servers 112 or databases 114 internal to or externally coupled with supply chain planner 110.

Server 112 of supply chain planner 110 may comprise modeler 210 and solver 212. Although server 112 is shown and described as comprising a single modeler 210 and a single solver 212, embodiments contemplate any suitable number or combination of these located at one or more locations, local to, or remote from supply chain planner 110, such as on multiple servers or computers at any location in supply chain network 100.

According to embodiments, modeler 210 of server 112 identifies resources, operations, buffers, and pathways, and maps supply chain network 100 using data models 222, as described in more detail below. In one embodiment, modeler 210 maps optional resources and material as primary and alternate pathways. In addition, or in the alternative, modeler 210 generates a supply chain planning problem to represent the flow of materials through supply chain network 100.

According to embodiments, solver 212 of supply chain planner 110 solves a supply chain planning problem as an LPP comprising three components: objectives, constraints, and bounds. According to embodiments, objectives of a multi-objective LPP represent business objectives (such as, for example, minimizing total inventory, maximizing profits, etc.); constraints comprise limitations to capacity, materials, lead times, and the like; and bounds comprise maximum and/or minimum values for decision variables (for example, in an embodiment in which capacity may only be used for ten hours per day, ten hours may be the upper bound on the capacity usage).

Database 114 of supply chain planner 110 may comprise one or more databases or other data storage arrangement at one or more locations, local to, or remote from, server 112. Database 114 comprises, for example, supply chain input data 220, data models 222, product data 224, demand data 226, inventory data 228, supply chain models 230, inventory policies 232, variable lists 234, LPP run results 236, and intermediate objectives data 238. Although database 114 is shown and described as comprising supply chain input data 220, data models 222, product data 224, demand data 226, inventory data 228, supply chain models 230, inventory policies 232, variable lists 234, LPP run results 236, and intermediate objectives data 238, embodiments contemplate any suitable number or combination of these, located at one or more locations, local to, or remote from, supply chain planner 110 according to particular needs.

As an example only and not by way of limitation, database 114 stores supply chain input data 220, including one or more supply chain planning problems of supply chain network 100 that may be used by supply chain planner 110, modeler 210, and/or solver 220. Supply chain input data 220 may comprise, for example, various decision variables, business constraints, goals, and objectives of one or more supply chain entities 150. According to some embodiments, supply chain input data 220 may comprise hierarchical objectives specified by, for example, business rules, master planning requirements, scheduling constraints, and discrete constraints, including, for example, sequence dependent setup times, lot-sizing, storage, shelf life, and the like.

Data models 222 represent the flow of materials through one or more supply chain entities 150 of supply chain network 100. Modeler 210 of supply chain planner 110 may model the flow of materials through one or more supply chain entities 150 of supply chain network 100 as one or more data models comprising, for example, a network of nodes and edges. Material storage and/or transition units may be modeled as nodes, which may be referred to as buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modeled as edges connecting the nodes. Each edge may represent the flow, transportation, or assembly of materials (such as items or resources) between the nodes by, for example, production processing or transportation. A planning horizon for data models 222 may be broken down into elementary time-units, such as, for example, time-buckets, or, simply, buckets. The edge between two buffer nodes denote processing of material and the edge between different buckets for the same buffer indicates inventory carried forward. Flow-balance constraints for most, if not every buffer in every bucket, model the material movement in supply chain network 100.

Product data 224 of database 114 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 224 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Demand data 226 of database 114 may comprise, for example, any data relating to past sales, past demand, purchase data, promotions, events, or the like of one or more supply chain entities 150. Demand data 226 may cover a time interval such as, for example, by the minute, hour, daily, weekly, monthly, quarterly, yearly, or any suitable time interval, including substantially in real time. According to embodiments, demand data 226 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 228 of database 114 may comprise any data relating to current or projected inventory quantities or states, order rules, or the like. For example, inventory data 228 may comprise the current level of inventory for each item at one or more stocking locations across supply chain network 100. In addition, inventory data 228 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 228 in database 114, which may be used by supply chain planner 110 to place orders, set inventory levels at one or more stocking points, initiate manufacturing of one or more items (or components of one or more items), or the like. In addition, or as an alternative, inventory data 228 may be updated by receiving current item quantities, mappings, or locations from inventory system 120, transportation network 130, one or more imaging devices 140, and/or one or more supply chain entities 150.

Supply chain models 230 of database 114 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). Additionally, or in the alternative, supply chain models 230 may comprise characteristics that specify the supply chain structure in even more detail, including, for example, specifying the type of collaboration with the customer (e.g. Vendor-Managed Inventory (VMI)), from which stocking locations or suppliers items may be sourced, customer priorities, demand priorities, how products may be allocated, shipped, or paid for, by particular customers, and the destination stocking locations or one or more supply chain entities 150 where items may be transported. Each of these characteristics may lead to different supply chain models 230.

Inventory policies 232 of database 114 may comprise any suitable inventory policy describing the reorder point and target quantity, or other inventory policy parameters that set rules for supply chain planner 110 to manage and reorder inventory. Inventory policies 232 may be based on target service level, demand, cost, fill rate, or the like. According to embodiments, inventory policies 232 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although a particular target service level and percentage is described, embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicates to one or more supply chain entities 150 to determine or receive inventory to replace the depleted inventory.

According to embodiments, solver 212 generates variable lists 234 comprising cumulative list of bound changes, a list of common variables, and a list of current run only variables. According to embodiments, solver 212 generates the cumulative list of bound changes while performing variable fixing during the solve of the multi-objective hierarchical LPP for the previous run. In addition, or as an alternative, solver 212 generates the list of common variables and the list of current run only variables after generating the multi-objective hierarchical LPP for the current run by mapping the variables of each multi-objective hierarchical LPP and storing the indication whether the variable is common to both multi-objective LPPs or is present in only the current run. Variable lists 234 are utilized in the process of solving a previous or base run LPP, in order to derive one or more intermediate objectives. Solver 212 may categorize variables according to whether they are used in only a first run (base run or previous run) of solving the LPP problem, used in only a second run (subsequent run or current run) of solving the LPP problem, or are common to both the first and second runs of the LPP problem. According to embodiments, the cumulative list of bound changes comprises a variable name and a status, wherein the status indicates whether the variable is fixed at its upper bound, fixed at its lower bound, or not fixed. According to an embodiment, the status indicates the bound change as per the higher objective which causes the bound change for a variable, if the same variable undergoes bound changes by more than one objective.

Solver 212 generates list of common variables and list of current run only variables. According to an embodiment, solver 212 checks variables in the current run with variables in the previous run and maps those variables common to both the previous run and the current run to the list of common variables and maps those variables present only in the current run to the list of current run only variables.

In an embodiment, solver 212 may store the results and/or solutions of one or more previous (or base run) LPP solves and/or one or more subsequent (or current run) LPP solves in LPP run results data 236 of database 114. As disclosed above, solver 212 calculates one or more intermediate objectives using variable lists 234, comprising the cumulative list of bound changes, list of common variables, and list of current-run only variables, as described in further detail below.

Figure 3:
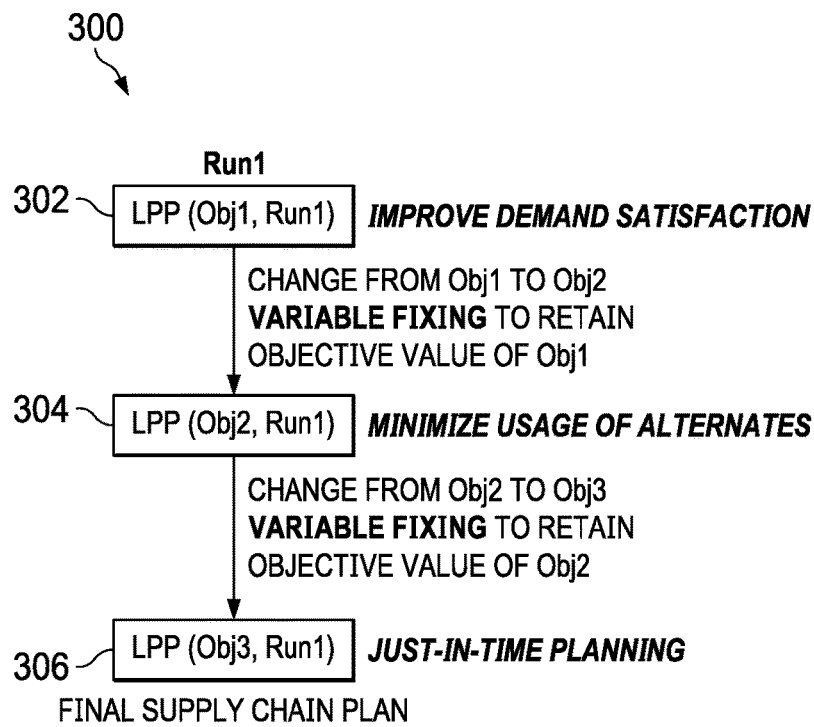
FIG. 3 illustrates a base run of a multi-objective hierarchical LPP, in accordance with an embodiment.

FIG. 3 illustrates base run 300 of a multi-objective hierarchical LPP, in accordance with an embodiment. Base run (Run1) 300 comprises the solutions of the multi-objective hierarchical LPP for each of three objectives: base run solution of the LPP for first objective (Obj1) 302; base run solution of LPP for second objective (Obj2) 304; and base run solution of LPP for third objective (Obj3) 306. In this example, Obj1 comprises improve demand satisfaction, which may be represented by an objective function that minimizes the quantity of unmet demand. Obj2 comprises maximizing usage of primary resources, which may be represented by an objective function that minimizes usage of alternate resources. By way of a further example, Obj3 comprises planning items as just-in-time (JIT) as possible, which may be represented by an objective function that minimizes the quantity of carried-over items. Although particular examples of objectives and objective functions are shown and described, embodiments contemplate any objective represented by minimizing or maximizing any suitable objective function, according to particular needs.

As described in more detail herein, embodiments of solver 212 of supply chain planner 110 may solve a multi-objective hierarchical LPP by iteratively loading and solving the LPP for each objective in accordance with an order described by a hierarchy of the objectives. A hierarchy of the objectives indicates that the hierarchical objectives are solved in the order indicated by the hierarchy, from an objective higher in the hierarchy (higher order or higher priority objective) to an objective lower in the hierarchy (lower order or lower priority objective). The hierarchical order of the objectives may indicate the order of importance of the objectives (i.e. the first objective is more important than the second objective; the second objective is more important than the third objective etc.). When solving the LPP for one or more lower objectives, solver 212 sets decision variables at their upper or lower bounds (which may be referred to as variable fixing) to retain the objective value of one or more higher objectives. In addition, or in the alternative, solver 212 may use, as a starting basis, some LPP solution information from the preceding higher objective when solving for a lower objective. After solving the LPP for a current objective, solver 212 updates the list of the variables to be fixed at their upper or lower bounds based on the solution to the current objective. Solver 212 may then iteratively repeat solving the LPP for each objective following this technique until solver 212 solves all objectives of the multi-objective hierarchical LPP, as described below.

According to embodiments, solver 212 uses a primal simplex method and/or a dual simplex method to solve each objective of an LPP by going from one basis to the next, iteratively, until reaching an optimal basis that is linked to a unique optimal solution of the LPP for the current objective. The optimal basis may be both primal-feasible and dual-feasible. Primal-infeasible and dual-infeasible refer to the performance of a particular starting basis when solving an LPP with a primal simplex method or a dual simplex method, as described below. When using a primal simplex method, solver 212 searches for a primal feasible basis (which may be dual infeasible) and then transforms the found primal feasible basis to another primal feasible basis, iteratively, until solver 212 identifies a primal feasible basis that is also the optimal basis. When using a dual simplex method, solver 212 searches for a dual feasible basis (which may be primal infeasible), and then transforms the found dual feasible basis to another dual feasible basis, iteratively, until solver 212 identifies a dual feasible basis that is also the optimal basis. Solver 212 uses a primal simplex method and a dual simplex method to solve an LPP by going from one basis to the next, iteratively, until reaching an optimal basis that is linked to a unique optimal solution of an LPP, which is both primal-feasible and dual-feasible.

Figure 4:
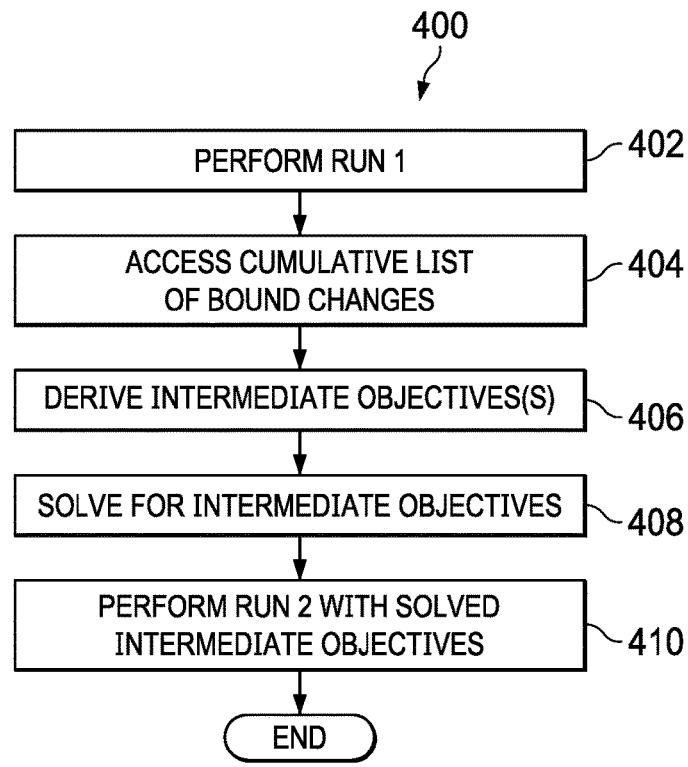
FIG. 4 illustrates a method of solving a multi-objective hierarchical LPP, in accordance with an embodiment.

FIG. 4 illustrates method 400 of solving a multi-objective hierarchical LPP incorporating solution information from a base or previous run into a subsequent run, in accordance with an embodiment. Method 400 proceeds by one or more activities, which although described in a particular order may be performed in one or more permutations, according to particular needs.

At activity 402, supply chain planner 110 performs a base run of a multi-objective hierarchical LPP. Modeler 210 may access one or more of supply chain input data 220, data models 222, product data 224, demand data 226, inventory data 228, supply chain models 230, and/or inventory policies 232, and may use data stored therein to generate a supply chain planning problem (including but not limited to a multi-objective hierarchical LPP) to represent the flow of materials through supply chain network 100. Solver 212 of supply chain planner 110 accesses the supply chain planning problem and may solve the supply chain planning problem as a multi-objective hierarchical LPP comprising three components: objectives, constraints, and bounds. Solver 212 may solve the multi-objective hierarchical LPP by iteratively loading and solving the LPP for each objective in accordance with an order described by a hierarchy of the objectives, as described above with reference to FIG. 3. Solver 212 may store the results of solving the multi-objective hierarchical LPP in LPP run results 236 of supply chain planner 110 database. Solver 212 may store, in the cumulative lists of bound changes in supply chain planner 110 database, one or more cumulative lists of all decision variables which solver 212 has set at an upper or lower bound (referred to above as variable fixing) while performing the base run of the multi-objective hierarchical LPP solve. For example, in the process of performing the base run, solver 212 may set all decision variables with negative reduced cost at the upper bound, and all decision variables with positive reduced cost at the lower bound, and may store the cumulative changes made to the decision variables in the cumulative lists of bound changes. Decision variables with zero reduced cost (having neither a good effect nor a bad effect on the objective value) may be free variables and may be set at upper bound, lower bound, or other bounds.

At activity 404, solver 212 accesses cumulative list of bound changes stored in the database. Because it is likely that the decision variables that improved the quality of the LPP base run will have a similar effect on subsequent LPP runs, and that the decision variables that degraded the quality of the LPP base run will have a similar effect on subsequent LPP runs, cumulative list of bound changes provides solution information that solver 212 may use to perform subsequent LPP runs with reduced computational requirements without impairing solution quality.

At activity 406, solver 212 derives one or more intermediate objectives using cumulative list of bound changes. Solver 212 solves the intermediate objective before solving objectives of subsequent LPP runs. For example, in an embodiment in which the base LPP run (Run1) comprises three objectives (Obj1, Run1; Obj2, Run1; and Obj3; Run1), and a subsequent LPP run (Run2) also comprises three objectives (Obj1, Run2; Obj2, Run2; and Obj3, Run2), solver 212 may derive an intermediate objective (Obj0, Run2) after performing Run1, and may solve Obj0, Run2 as the first objective solved in Run2, before solving Obj1, Run2. Solver 212 stores each intermediate objective in one or more intermediate objectives data 238 of supply chain planner database 114.

In an embodiment, solver 212 derives one or more intermediate objectives by accessing, (a) cumulative lists of bound changes from a previous (or base) run; (b) a list of common variables (i.e., variables shared between the previous (or base) run and the subsequent (or current) run; and (c) a list of current run only variables (i.e., variables that are newly introduced in the subsequent (or current) run). Solver 212 categorizes the variables of the list of common variables and the list of current run only variables according to the following four categories: Category a1 are the common variables which were fixed at a lower bound in the previous run; Category a2 are the common variables which were fixed at an upper bound in the previous run; Category a3 are the common variables that were not fixed to an upper bound or a lower bound in the previous run; and Category a4 are the current run only variables. Solver 212 assigns weights and/or coefficients to each of the categories and creates the intermediate objective as a linear minimization objective function comprising the weighted sum of each category of variables. In one embodiment, the intermediate objective is the following minimization problem:

Minimize:

a1*(sum of common variables fixed at lower bound in previous run)+ a2*(sum of common variables fixed at upper bound in previous run)+ a3*(sum of common variables not fixed at upper bound or lower bound in previous run)+ a4*(sum of current run only variables)

wherein a1, a2, a3, and a4 are the coefficient values assigned to the corresponding category (i.e., Category a1, Category a2, Category a3, and Category a4, respectively). Rules limit the values of the coefficients that solver 212 assigns to each category. According to embodiments, solver 212 assigns values to the coefficients of Category a1-a4 variables subject to the following rules: the coefficient of Category a1 is greater than zero to force these variables to the lower bound;

the coefficient of Category a2 is less than zero to force these variables to the upper bound; the coefficient of Category a3 is zero to not influence these variables; and the coefficient of Category a4 is greater than or equal to zero (to have no influence on these variables (a4=0) or to force these variables to the lower bound (a4>0)). According to some embodiments, the value for Category a1 is always greater than the value for Category a4. In addition, or as an alternative, the values for Category a1 and Category a2 are the same magnitude, but opposite sign (e.g., Category a1 is assigned a value of one hundred (100), and Category a2 is assigned a value of negative one hundred (−100)). Although particular values are described for the Categories of variables used to assigned coefficients/weights for the intermediate objective function in the form of a minimization problem comprising the weighted sums of each category of variables, embodiments contemplate other suitable values, according to particular needs.

At activity 408, solver 212 solves the LPP of the subsequent (or current) run for the intermediate objective (Obj0, Run2) and utilizes the solution to generate the starting basis for the first objective of the subsequent LPP run (in the example described above, Obj1, Run2). Because the intermediate objective incorporates information derived from solving the previous run, using the solution of the current run LPP for the intermediate objective as the starting basis for solving the first objective of the current run LPP provides a "warm start" that reduces solve time.

At activity 410, solver 212 performs the solve of the subsequent run of the multi-objective hierarchical LPP. As disclosed above, solver 212 uses the solution of the subsequent run LPP for the intermediate objective (Obj0) as the starting basis for the solve of the first objective of the subsequent LPP run. Solver 212 iteratively solves the subsequent run LPP for each objective and stores the LPP run results and solution information as LPP run results 236 of database 114. After solving the multi-objective hierarchical LPP of the subsequent run, supply chain planner 110 terminates method 400, and method 400 ends. According to embodiments, the multi-objective hierarchical LPP is a master planning problem, wherein the intermediate objective is derived from the solution of the previous master planning problem (such as, for example, the previous day's master planning problem) and used as a warm start that improves the speed of solving the current master planning problem (such as, for example, the current day's master planning problem). By way of a further example and not by way of limitation, the intermediate objective is used to increase the speed of running scenarios by using the solution information from the base run to generate the intermediate objective for improving the speed of solving the different scenarios. Embodiments further contemplate campaign planning to reduce setup time by iteratively solving multi-objective hierarchical linear programming problems representing the campaign planning problem, and deriving the intermediate objective from the prior iteration to improve solve time for the subsequent iteration.

To illustrate supply chain planner 110 solving a multi-objective hierarchical LPP incorporating solution information from a base (or previous) run into a subsequent run, the following example is provided. In this example, supply chain planner 110 implements activities of method 400 to perform a base LPP run (Run1), derive an intermediate objective using cumulative list of bound changes from the base LPP run, solve the intermediate objective, and use the solution of the intermediate objective to reduce solve time of the subsequent LPP run (Run2). Continuing the example, at activity 402, supply chain planner 110 performs a base run of a multi-objective hierarchical LPP. In this example, the base run is Run1, and the subsequent run is Run2, as illustrated by FIG. 5.

Figure 5:
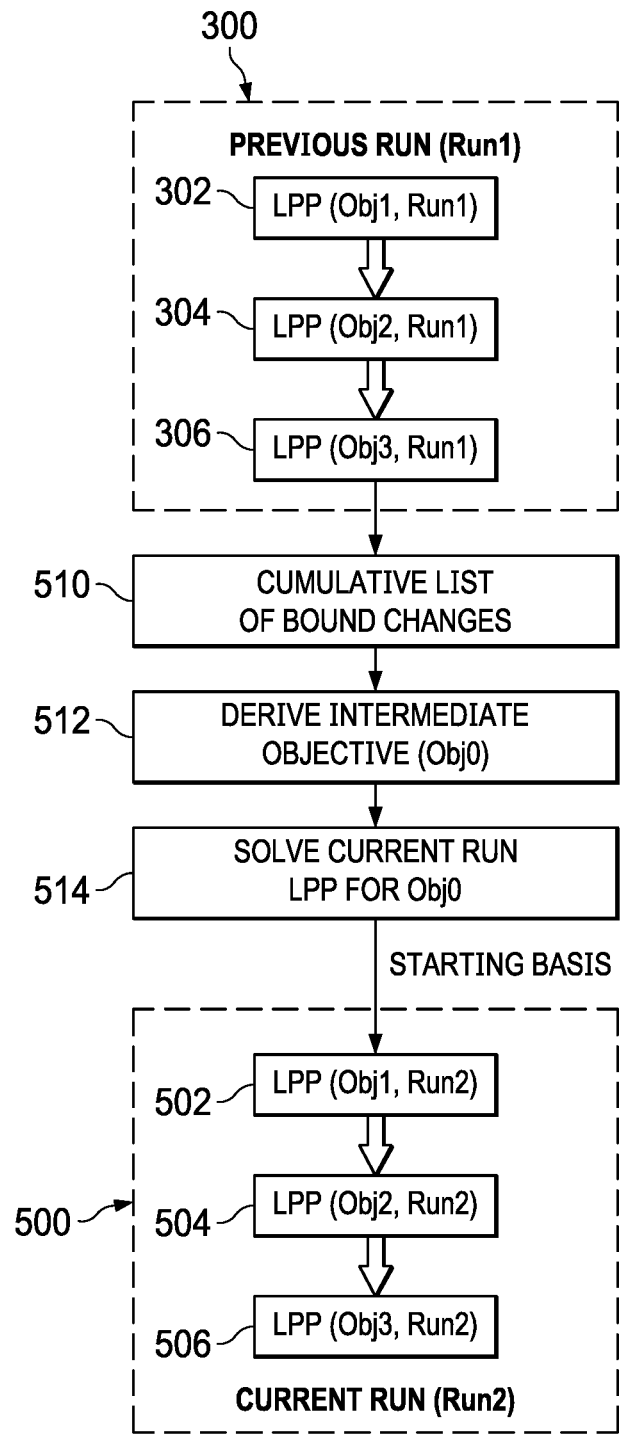
FIG. 5 illustrates the supply chain planner executing the activities of the FIG. 4 method, in accordance with an embodiment.

FIG. 5 illustrates supply chain planner 110 executing the activities of method 400 of FIG. 4, in accordance with an embodiment. Continuing the example, modeler 210 may access one or more of supply chain input data 220, data models 222, product data 224, demand data 226, inventory data 228, supply chain models 230, and/or inventory policies 232, and uses the accessed data to generate a multi-objective hierarchical LPP (in this example, Run1) to represent the flow of materials through supply chain network 100. Solver 212 of supply chain planner 110 accesses the Run1 LPP 300 and solves the Run1 LPP 300 as a multi-objective hierarchical LPP comprising three components: objectives (in this example, Obj1, Run1 302; Obj2, Run1 304; and Obj3, Run1 306), constraints, and bounds. Solver 212 solves Run1 LPP 300 by iteratively loading and solving the LPP for each objective (Obj1, Run1 302; Obj2, Run1 304; and Obj3, Run1 306), beginning with Obj1, Run1 302 and finishing with Obj3, Run1 306. Solver 212 stores the results of solving Run1 in LPP run results 236 of supply chain planner 110 database. Solver 212 stores, in the cumulative lists of bound changes in supply chain planner 110 database, a cumulative lists of all decision variables which solver 212 has set at an upper or lower bound while solving Run1.

Continuing the example, at activity 404, solver 212 accesses cumulative list of bound changes 510 stored in the database. Because it is likely that the decision variables that improved the quality of Run1 300 will have a similar effect on subsequent Run2 500, and that the decision variables that degraded the quality of Run1 300 will have a similar effect on subsequent Run2 500, cumulative list of bound changes 510 provides solution information that solver 212 uses to perform Run2 500 with reduced computational requirements without impairing solution quality.

Continuing the example, at activity 406, solver 212 derives an intermediate objective 512 (in this example, Obj0) using cumulative list of bound changes 510. Solver 212 may solve the Obj0 intermediate objective 514 before solving any of the three objectives (502-506) of Run 2 500 (in this example, Run2 500 comprises the following three objectives: Obj1, Run2 502; Obj2, Run2 504; and Obj3, Run2 506). Solver 212 stores the Obj0 intermediate objective in intermediate objectives data 238 of supply chain planner 110 database. As disclosed above, solver 212 derives the Obj0 intermediate objective 512 by accessing (a) the cumulative list of bound changes 510, (b) the list of common variables, and (c) the list of current run only variables and categorizing the variables into Category a1, Category a2, Category a3, or Category a4. Solver 212 assigns weights and/or coefficients to each of Categories a1, a2, a3, and a4 to create the linear minimization objective function that is utilized as the intermediate objective. In the embodiment of this example, solver 212 assigns the coefficients to each Category as follows: the coefficient of Category a1 is one hundred, which forces these variables to the lower bound; the coefficient of Category a2 is negative one hundred, which forces these variables to the upper bound; the coefficient of Category a3 is zero which has no influence on these variables; and the coefficient of Category a4 is one, which forces these variables to the lower bound, but with a much lower effect than the variables of Category a1 (which are assigned a higher coefficient and are therefore more affected by the minimization optimization).

Continuing the example, at activity 408, solver 212 solves the Obj0 intermediate objective 514. Solver 212 uses the solution of solving the Obj0 intermediate objective as the starting basis for solving the first objective 502 of Run2 500 (in this example, Obj1, Run2 502). The optimal basis (i.e., solution) of the intermediate objective solve is a feasible solution that has potentially good variables at the upper bound and potentially bad variables at the lower bound, to the extent possible without violating plan feasibility. Using the optimal basis of the intermediate objective solve as a starting basis for the current run is likely to reduce simplex iterations in the current run, which reduces the runtime and without compromising plan quality.

Concluding the example, at activity 410, solver 212 solves Run2 500, using the solved Obj0 intermediate objective as the starting basis for Obj1, Run2 502. Supply chain planner 110 stores the results of solving Run2 500 in LPP run results 236 of supply chain planner 110 database, then terminates method 400.

When testing was performed using IBM CPLEX Python API, supply chain planner 110 solves the multi-objective hierarchical LPP faster using method 400 and method 600 (FIG. 6) for nine of the ten datasets, with % time saved for those nine datasets of 15%-60%, which validates methods 400 and 600 as a source of LPP run performance improvement.

Figure 6:
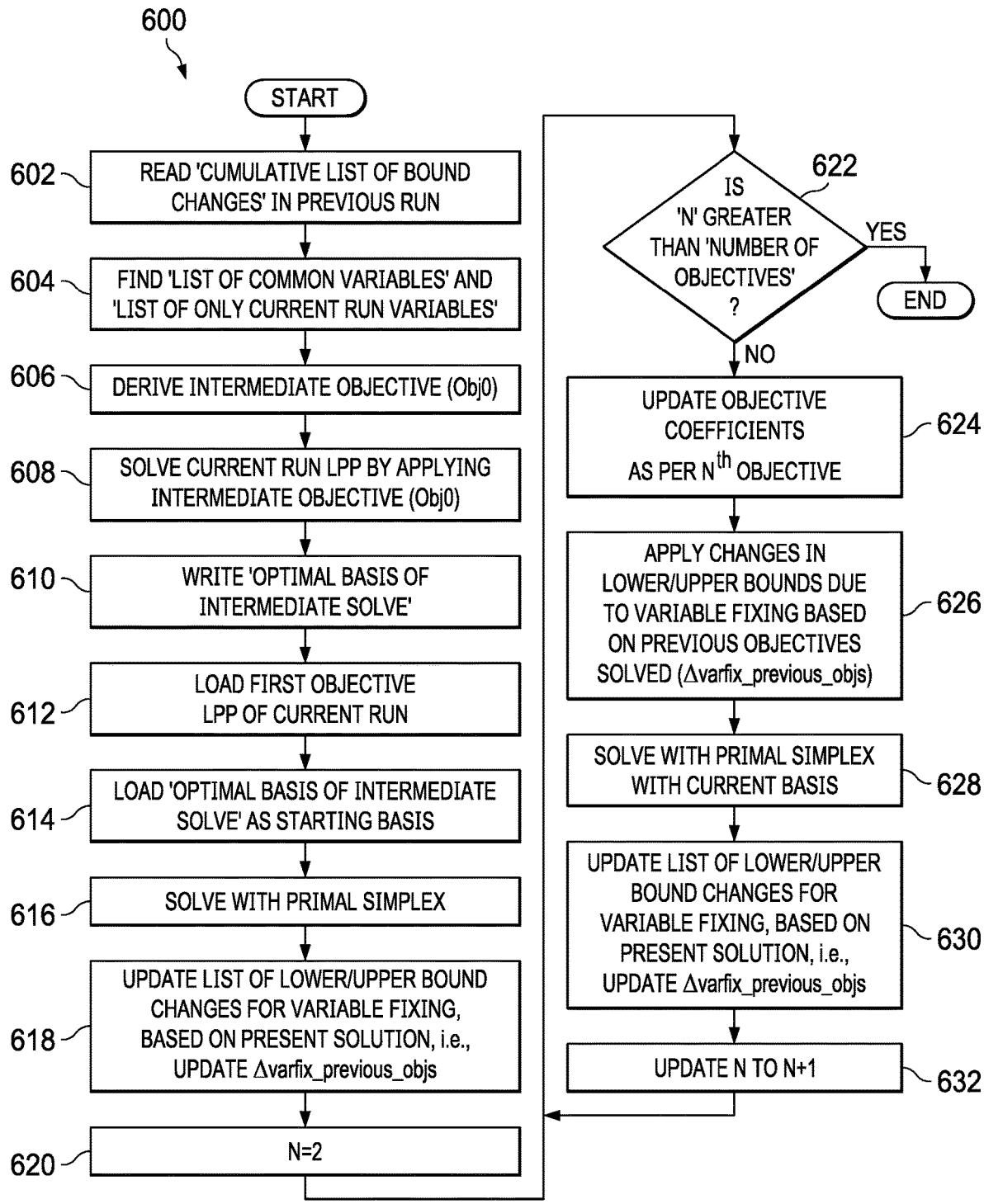
FIG. 6 illustrates a method to solve a multi-objective hierarchical LPP, in accordance with an embodiment.

FIG. 6 illustrates method 600 a second embodiment of solving a multi-objective hierarchical LPP using an intermediate objective, in accordance with an embodiment. Method 600 proceeds by one or more activities, which although described in a particular order may be performed in one or more permutations, according to particular needs.

At activity 602, supply chain planner 110 reads a "Cumulative List of Bound Changes" generated during a previous LPP run. As disclosed above, the supply chain planner tracks fixed variables and whether the variables are fixed at their upper or lower bounds during the solve of the previous LPP run. For example, after solving each objective, variable fixing for minimization is done where variables with negative reduced cost are fixed at the Upper Bound while variables with positive reduced cost are fixed at the Lower Bound. Solver 212 generates "Cumulative List of Bound Changes" while solving all the objectives in previous run, wherein "Cumulative List of Bound Changes" comprises the variable name and its status as 'Fixed at UB', 'Fixed at LB', and/or 'Not fixed'. When increasing the value of a variable causes improvement for a certain objective, the variable is set to an upper bound during variable fixing after solving this objective. For a minimization objective, a variable with negative reduced cost improves the objective and is set to an upper bound during variable fixing after solving the objective. When increasing the value of a variable causes degradation for a certain objective, then the variable is set to a lower bound during variable fixing after solving this objective. For a minimization objective, a variable with positive reduced cost degrades the objective and is set to a lower bound during variable fixing after solving the objective. When a variable causes improvement for a higher objective and degradation for a lower objective, the variable is set to the upper bound after solving the higher objective and to a lower bound after solving the lower objective. According to embodiments, when a variable is fixed to a first bound at a higher order objective and fixed to a different bound during a lower order objective, the cumulative list of bound changes comprises the bound change for the higher order objective.

At activity 604, supply chain planner 110 accesses "List of Common Variables" and one or more "List of Current Run Only Variables" stored in supply chain planner 110 database. Solver 212 compares variables between the previous run and the current run to generate the following lists: "List of Common Variables" (i.e., variables in both previous run and current run) and "List of Current Run Only Variables". According to embodiments, the previous run and subsequent run may comprise the following examples: using solution information from the previous master planning run (such as, for example, the previous day's run) in a present master planning run (such as, for example, today's run); running scenarios efficiently using solution information of a base run; and in a campaign planning heuristic for setup time reductions where a multi-objective LPP is solved multiple times, the solution information from previous iteration is used to efficiently solve the next iteration.

At activity 606, supply chain planner 110 derives the intermediate objective. As disclosed above, the intermediate objective comprises a minimization problem with weights (coefficient values) assigned to each category of variables, wherein rules limit the values of the coefficients that are assigned to each category. At activity 608, supply chain planner 110 solves the current run LPP by applying the derived intermediate objective.

At activity 610, supply chain planner 110 stores an "Optimal Basis of Intermediate Solve" variable in supply chain planner 110 database. When the intermediate objective is solved, solver 212 uses the optimal basis as the 'starting basis' for the first objective of current run. In one embodiment, using the intermediate objective optimal basis as the starting basis improves variables at the upper bound and deteriorates variables at the lower bound for current run, which provides a warm start for a current run, potentially decreasing the simplex iterations and hence reducing the solve time.

At activity 612, supply chain planner 110 loads the first objective LPP of the current run. At activity 614, supply chain planner 110 loads the previously-stored "Optimal Basis of Intermediate Solve" variable as a starting basis for the current run. At activity 616, supply chain planner 110 solves the first objective LPP of the current run using a primal simplex algorithm. At activity 618, supply chain planner 110 (1) updates lists of lower/upper bound variable changes for variable fixing, based on the present solution (for example, in an embodiment, updating Δvarfix_previous_objs), and (2) stores an associated N value variable in supply chain planner 110 database.

At activity 620, supply chain planner 110 accesses the N value variable stored in supply chain planner 110 database, as well as a "Number of Objectives" variable stored in supply chain planner 110 database. At activity 622, supply chain planner 110 compares the N value variable to the "Number of Objectives" variable. When the N value variable is greater than the "Number of Objectives" variable, supply chain planner 110 terminates method 600. When the N value variable is not greater than the "Number of Objectives" variable, supply chain planner 110 initiates activity 624 and updates objective coefficients as per the $N^{th}$ objective.

At activity 626, supply chain planner 110 applies changes in lower/upper bound variables due to variable fixing based on previously-solved objectives (Δvarfix_previous_objs). At activity 628, supply chain planner 110 solves with the current basis using a primal simplex algorithm. At activity 630, supply chain planner 110 updates lists of lower/upper bound variable changes for variable fixing, based on the present solution (for example, in an embodiment, updating Δvarfix_previous_objs). At activity 632, supply chain planner 110 updates the value of the N value variable to N+1, and supply chain planner 110 returns to activity 620 to iteratively perform the activities disclosed above until the counter, N, is greater than the number of the objectives level or detects one or more other stopping criteria, such as, for example, a maximum time lime, maximum number of iterations, or another stopping criterion is reached.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for reducing a computational runtime to re-run computer solves of one or more-supply chain planning problems modeled as one or more multi-objective hierarchical linear programming problems, comprising:
   one or more imaging devices comprising one or more electronic devices configured to receive imaging information from one or more sensors, the one or more imaging devices configured to generate a mapping of one or more items to determine a current location of the one or more items at one or more supply chain entities;
   a computer, comprising a processor and memory, and configured to:
      receive supply chain input data for a supply chain planning problem;
      model the supply chain planning problem as a first multi-objective hierarchal linear programming problem comprising a first Run1 objective and at least one additional Run1 objective, and based, at least in part, on the supply chain input data;
      solve the first multi-objective hierarchical linear programming problem for the first Run1 objective and the at least one additional Run1 objective;
      store a cumulative list of bound changes in the computer memory during the solve of the first multi-objective hierarchical linear programming problem;
      receive one or more changes to the supply chain input data;
      model a second supply chain planning problem as a second multi-objective hierarchal linear programming problem based, at least in part, on the one or more changes to the supply chain input data, wherein the second multi-objective hierarchical linear programming problem comprises a first Run2 objective and at least one additional Run2 objective;
      identify common variables and non-common variables, wherein an intermediate objective is a minimization of weighted sums of categorized common and non-common variables, wherein the weighted sums of categorized common and non-common variables comprise:
         a first category comprising common variables fixed at a lower bound;
         a second category comprising common variables fixed at an upper bound;
         a third category comprising common variables that are not fixed to an upper bound or to a lower bound; and
         a fourth category comprising non-common variables, wherein non-common variables are variables present in the second multi-objective hierarchical linear programming problem and not present in the first multi-objective hierarchical linear programming problem;
      derive the intermediate objective based, at least in part, on the cumulative list of bound changes;
      increase linear programming problem solution speed using an optimization API by:
         solving the second multi-objective hierarchical linear programming problem for the intermediate objective; and
         solving the second multi-objective hierarchical linear programming problem, using a basis of the solved intermediate objective, for at least the first Run2 objective;
      receive product data from automated robotic machinery comprising at least one sensor, wherein the product data corresponds to an item of the one or more items detected by the automated robotic machinery;
      generate a first mapping and a second mapping of the item, the first mapping associated with a first current location of the item, and the second mapping associated with a second past location of the item;
      compare the first mapping and the second mapping to determine if the first current location of the item is different from the second past location of the item;
      monitor one or more supply chain constraints of the one or more items at the one or more supply chain entities and adjust a current inventory of the one or more supply chain entities by sending instructions to the automated robotic machinery based, at least in part, on the one or more supply chain constraints and one or more differences between the first mapping and the second mapping;
      in response to sending the instructions to the automated robotic machinery, automatically locate items to add or remove from the current inventory of the one or more supply chain entities; and
      automatically adding or removing by the automated robotic machinery the automatically located items from the current inventory.

2. The system of claim 1, wherein, when a variable is fixed to a first bound at a higher order objective and fixed to a different bound during a lower order objective, the cumulative list of bound changes comprises the bound change for the higher order objective.

3. The system of claim 1, wherein the computer uses a primal simplex algorithm to solve the second supply chain planning problem as a multi-objective hierarchical linear programming problem.

4. The system of claim 1, wherein the first supply chain planning problem is a master planning problem from a previous run and the second supply chain planning problem is a master planning problem for a current run.

5. The system of claim 1, wherein the first supply chain planning problem is a first iteration of a campaign planning problem and the second supply chain planning problem is a second iteration of the campaign planning problem, wherein the intermediate objective is generated between each iteration to reduce setup times.

6. A method for reducing a computational runtime to re-run computer solves of one or more supply chain planning problems modeled as one or more multi-objective hierarchical linear programming problems, comprising:

receiving imaging information from one or more sensors associated with one or more imaging devices comprising one or more electronic devices, the one or more imaging devices configured to generate a mapping of one or more items to determine a current location of the one or more items at one or more supply chain entities;

receiving, by a computer comprising a processor and memory, supply chain input data for a supply chain planning problem;

modeling, by the computer, the supply chain planning problem as a first multi-objective hierarchal linear programming problem comprising a first Run1 objective and at least one additional Run1 objective, and based, at least in part, on the supply chain input data;

solving, by the computer, the first multi-objective hierarchical linear programming problem for the first Run1 objective and the at least one additional Run1 objective;

storing, by the computer, a cumulative list of bound changes in the computer memory during the solve of the first multi-objective hierarchical linear programming problem;

receiving, by the computer, one or more changes to the supply chain input data;

modeling, by the computer, a second supply chain planning problem as a second multi-objective hierarchal linear programming problem based, at least in part, on the one or more changes to the supply chain input data, wherein the second multi-objective hierarchical linear programming problem comprises a first Run2 objective and at least one additional Run2 objective;

identifying, by the computer, common variables and non-common variables, wherein an intermediate objective is a minimization of weighted sums of categorized common and non-common variables, wherein the weighted sums of categorized common and non-common variables comprise:
  a first category comprising common variables fixed at a lower bound;
  a second category comprising common variables fixed at an upper bound;
  a third category comprising common variables that are not fixed to an upper bound or to a lower bound; and
  a fourth category comprising non-common variables, wherein non-common variables are variables present in the second multi-objective hierarchical linear programming problem and not present in the first multi-objective hierarchical linear programming problem;

deriving, by the computer, the intermediate objective based, at least in part, on the cumulative list of bound changes;

increasing, by the computer, linear programming problem solution speed using an optimization API by:
  solving, by the computer, the second multi-objective hierarchical linear programming problem for the intermediate objective; and
  solving, by the computer, the second multi-objective hierarchical linear programming problem, using a basis of the solved intermediate objective, for at least the first Run2 objective;

receiving product data from automated robotic machinery comprising at least one sensor, wherein the product data corresponds to an item of the one or more items detected by the automated robotic machinery;

generating a first mapping and a second mapping of the item, the first mapping associated with a first current location of the item, and the second mapping associated with a second past location of the item;

comparing the first mapping the and second mapping to determine if the first current location of the item is different from the second past location of the item;

monitoring one or more supply chain constraints of the one or more items at the one or more supply chain entities and adjusting a current inventory of the one or more supply chain entities by sending instructions to the automated robotic machinery based, at least in part, on the one or more supply chain constraints and one or more differences between the first mapping and the second mapping;

in response to sending the instructions to the automated robotic machinery, automatically locating items to add or remove from the current inventory of the one or more supply chain entities; and automatically adding or removing by the automated robotic machinery the automatically located items from the current inventory.

7. The method of claim 6, wherein, when a variable is fixed to a first bound at a higher order objective and fixed to a different bound during a lower order objective, the cumulative list of bound changes comprises the bound change for the higher order objective.

8. The method of claim 6, wherein the computer uses a primal simplex algorithm to solve the second supply chain planning problem as a multi-objective hierarchical linear programming problem.

9. The method of claim 6, wherein the first supply chain planning problem is a master planning problem from a previous run and the second supply chain planning problem is a master planning problem for a current run.

10. The method of claim 6, wherein the first supply chain planning problem is a first iteration of a campaign planning problem and the second supply chain planning problem is a second iteration of the campaign planning problem, wherein the intermediate objective is generated between each iteration to reduce setup times.

11. A non-transitory computer-readable medium embodied with software for reducing a computational runtime to re-run computer solves of one or more supply chain planning problems modeled as one or more multi-objective hierarchical linear programming problems, the software when executed:

receives imaging information from one or more sensors associated with one or more imaging devices comprising one or more electronic devices, the one or more imaging devices configured to generate a mapping of one or more items to determine a current location of the one or more items at one or more supply chain entities;

receives supply chain input data for a supply chain planning problem;

models the supply chain planning problem as a first multi-objective hierarchal linear programming problem comprising a first Run1 objective and at least one additional Run1 objective, and based, at least in part, on the supply chain input data;

solves the first multi-objective hierarchical linear programming problem for the first Run1 objective and the at least one additional Run1 objective;

stores a cumulative list of bound changes in the computer memory during the solve of the first multi-objective hierarchical linear programming problem;

receives one or more changes to the supply chain input data;

models a second supply chain planning problem as a second multi-objective hierarchal linear programming problem based, at least in part, on the one or more changes to the supply chain input data, wherein the second multi-objective hierarchical linear programming problem comprises a first Run2 objective and at least one additional Run2 objective;

identifies common variables and non-common variables, wherein the intermediate objective is a minimization of weighted sums of categorized common and non-common variables, wherein the weighted sums of categorized common and non-common variables comprise:
  a first category comprising common variables fixed at a lower bound;
  a second category comprising common variables fixed at an upper bound;
  a third category comprising common variables that are not fixed to an upper bound or to a lower bound; and
  a fourth category comprising non-common variables, wherein non-common variables are variables present in the second multi-objective hierarchical linear programming problem and not present in the first multi-objective hierarchical linear programming problem;

derives the intermediate objective based, at least in part, on the cumulative list of bound changes;

increases linear programming problem solution speed using an optimization API by:
  solving the second multi-objective hierarchical linear programming problem for the intermediate objective; and
  solving the second multi-objective hierarchical linear programming problem, using a basis of the solved intermediate objective, for at least the first Run2 objective;

receives product data from automated robotic machinery comprising at least one sensor, wherein the product data corresponds to an item of the one or more items detected by the automated robotic machinery;

generates a first mapping and a second mapping of the item, the first mapping associated with a first current location of the item, and the second mapping associated with a second past location of the item;

compares the first mapping and the second mapping to determine if the first current location of the item is different from the second past location of the item;

monitors one or more supply chain constraints of the one or more items at the one or more supply chain entities and adjusts a current inventory of the one or more supply chain entities by sending instructions to the automated robotic machinery based, at least in part, on the one or more supply chain constraints and one or more differences between the first mapping and the second mapping;

in response to sending the instructions to the automated robotic machinery, automatically locates items to add or remove from the current inventory of the one or more supply chain entities; and automatically adding or removing by the automated robotic machinery the automatically located items from the current inventory.

12. The non-transitory computer-readable medium of claim 11, wherein, when a variable is fixed to a first bound at a higher order objective and fixed to a different bound during a lower order objective, the cumulative list of bound changes comprises the bound change for the higher order objective.

13. The non-transitory computer-readable medium of claim 11, wherein the software uses a primal simplex algorithm to solve the second supply chain planning problem as a multi-objective hierarchical linear programming problem.

14. The non-transitory computer-readable medium of claim 11, wherein the first supply chain planning problem is a master planning problem from a previous run and the second supply chain planning problem is a master planning problem for a current run.

* * * * *